United States Patent [19]

Ma et al.

[11] Patent Number: 4,954,279

[45] Date of Patent: Sep. 4, 1990

[54] AIRCRAFT DE-ICING AND ANTI-ICING COMPOSITION

[75] Inventors: Frank Ma, St. Leonard; Daniel Comeau, Lachenaie, both of Canada

[73] Assignee: Union Carbide Corporation, Danbury, Conn.

[21] Appl. No.: 153,212

[22] Filed: Feb. 8, 1988

Related U.S. Application Data

[63] Continuation-in-part of Ser. No. 142,335, Dec. 29, 1987, abandoned, which is a continuation of Ser. No. 907,258, Sep. 15, 1986, abandoned.

[30] Foreign Application Priority Data

Aug. 28, 1986 [CA] Canada ................................... 517026

[51] Int. Cl.$^5$ ............................................. C09K 3/18
[52] U.S. Cl. ........................................ 252/70; 106/13; 252/306; 252/312
[58] Field of Search .......................... 252/70, 306, 312; 106/13

[56] References Cited

U.S. PATENT DOCUMENTS

| 2,150,936 | 3/1939 | Morgan | 252/73 |
|---|---|---|---|
| 2,373,727 | 4/1945 | West et al. | 106/13 |
| 4,342,596 | 8/1982 | Conner, Sr. | 106/14.27 |
| 4,358,389 | 11/1982 | König-Lumer et al. | 252/70 |
| 4,371,447 | 2/1983 | Webb et al. | 252/73 |

FOREIGN PATENT DOCUMENTS

| 3142059 | 5/1983 | Fed. Rep. of Germany | 252/70 |
|---|---|---|---|
| 1415113 | 9/1965 | France . | |
| 8600919 | 2/1986 | PCT Int'l Appl. . | |
| 962351 | 7/1964 | United Kingdom . | |

OTHER PUBLICATIONS

Research Disclosure, item 25246, Apr., 1985, "Aircraft De-Icer", Anonymous.

*Primary Examiner*—Robert A. Wax
*Attorney, Agent, or Firm*—Norman L. Balmer

[57] ABSTRACT

A composition is described which consists of a microemulsion of oil in a water/glycol solution containing certain thickening agents, emulsifiers, substantially water-insoluble, partially polar oils, and alkanolamines to provide the desirable viscosity and shear stability needed to give a composition having effective de-icer and anti-icing properties.

14 Claims, No Drawings

AIRCRAFT DE-ICING AND ANTI-ICING COMPOSITION

This is a continuation-in-part of U.S. Ser. No. 142,335, filed Dec. 29, 1987, now abandoned, which in turn is a continuation of U.S. Ser. No. 907,258, filed Sept. 15, 1986, now abandoned.

FIELD OF THE INVENTION

This invention relates to water/glycol compositions which have both de-icing and anti-icing properties when applied to surfaces. More particularly, it relates to compositions which can be applied to aircraft surfaces to remove ice and/or snow from the surfaces and remain on the surfaces to provide protection from ice and/or snow build up, yet be readily removed from the surfaces by the forces generated during take-off of the aircraft.

BACKGROUND OF THE INVENTION

Aircraft are subject to the buildup of ice, frost and/or snow on their surfaces while the aircraft are on the ground during cold weather in the presence of relatively high humidity, rain and/or snow. Because the buildup of ice, frost and/or snow on the aircraft surfaces can adversely affect the functioning of the aircraft, such buildups should be removed from the airplane prior to takeoff.

De-icing solutions, such as those based upon ethylene glycol and water, have been used for many years to remove ice, frost and/or snow from the aircraft surfaces. These de-icing compositions can effectively remove the buildup of ice, frost and/or snow from the surfaces but since they have low viscosities, they readily flow off the aircraft surfaces and thus provide limited protection from the formation of further frost and ice or accumulation of snow on the surfaces.

Anti-icing fluids are those that will prevent the formation of frost and ice or the accumulation of snow on surfaces over extended periods of time. The use of anti-icing fluids would be particularly desirable for overnight frost protection and for use during bad weather operation to accommodate substantial delays between the time the aircraft departs a gate and takeoff.

One approach to formulating anti-icing fluids is to add thickening agents to de-icing fluids. The thickening agents are intended to increase the viscosity of the fluid and thereby reduce its tendency to run off the surfaces of the aircraft. A number of thickened fluids are commercially available in the world. These include Kilfrost Anti-icing Barrier Compound, Hoechst A. G. Aircraft De-icing Fluid 1704, and SPCA Aircraft De-icer 84. Union Carbide Corporation introduced UCON ™ Anti-icing Fluid E, an ethylene glycol based fluid containing polyacrylate, in 1968. In 1969, Union Carbide Europe developed a propylene glycol-based product, Aircraft De-icing fluid 251, which was a non-Newtonian fluid containing a crosslinked polyacrylic acid as a thickener.

An anti-icing fluid must meet a number of criteria. One of the most important criteria is that the anti-icing fluid be readily removed from the surfaces of the aircraft during its takeoff. This ability to be released from the aircraft surfaces must exist even if no precipitation occurs after the application of the anti-icing fluid and some of the fluid evaporates. Moreover, the fluid should have unusual rheological properties in that it must have sufficient viscosity to be retained on the aircraft surface yet require little force for it to be removed from the surface. Another important consideration in providing an anti-icing fluid is that the fluid should be capable of being applied using conventional spraying devices. Since these spraying devices can subject the thickened fluid to stress, the fluid must not be subject to undue shear instability and loss of thickening properties due to the application procedures. Loss of rheological properties are often experienced during the spray application of anti-icing fluids using a cross linked polyacrylate thickener. Another concern when using thickened fluids for anti-icing agents is the stability of the fluid during storage. For example, if an anti-icing fluid tends to gel during storage, the fluid, when applied, may be too viscous for effective removal from the aircraft or, if the gelling results in phase separation, the fluid may lose viscosity and thus not provide the desired anti-icing properties.

In addition to the foregoing requirements, a good anti-icing agent should also induce no appreciable erosive or corrosive activity, particularly towards aluminum, non-ferrous metals, steel, glass and acrylic sheeting. The anti-icing fluid should also be an effective de-icer resulting in rapid and complete thawing of ice, snow and frost and it should provide a coherent liquid film after application to the aircraft surfaces, i.e., it should wet the surfaces with which it comes in contact. Most advantageously, anti-icing fluids should be environmentally acceptable, provide minimum toxicity to plants and animals, and provide little risk of flammability.

Recent tests using commercially available anti-icing fluids on a simulated segment of an aircraft wing indicate that the anti-icing fluids can result in appreciable lift loss as compared to de-icing (unthickened) fluids. Accordingly, substantial room for improvement in anti-icing fluids for aircrafts exists.

U.S. Pat. No. 2,373,727, West, et al., discloses compositions to prevent or reduce the formation and/or accretion of ice on aircraft surfaces. The compositions comprise a jelly base consisting of gelatinous material and glycol or glycerol or homologs thereof or polyglycols or polyglycerols, e.g., diethylene glycol or triethylene glycol, and from 5 to 20 percent by weight of a liquid which is immiscible with ice or water and remains liquid at temperatures down to 10° F. The immiscible liquids are disclosed to be mineral, vegetable and animal oils including essential oils such as petroleum lubricating oils, castor oils and pine oils, synthetic oils, the water immiscible alcohols and similar liquids. West, et al., state that it is necessary to add a dispersing agent such as alkali metal or organic based soaps or fatty acids or oleic acid, napthanates, sulfonic acid salts, commercial soaps or monohydric alcohols. The jelly base may be prepared from any suitable material such as gelatin, glue, soap or gum which forms a heat reversible, jelly-like mass with the glycol or glycerol.

U.S. Pat. No. 4,358,389, Koenig-Lummer, et al., disclose anti-icing compositions that contain 0.05 to 1.5 percent by weight of a particular crosslinked polyacrylate, glycol, water, 0.05 to 1 percent by weight of a water insoluble component comprising a mixed base mineral oil comprising paraffin hydrocarbons and naphthenes, 0.05 to 1 percent by weight of a surface active agent comprising alkali metal alkylaryl sulfonate, corrosion inhibitor and a quantity of at least one alkaline compound selected from the group consisting of alkali metal carbonates, bicarbonates or hydroxides and amines, such that the pH of the composition is between about 7.5 and 10. Koenig-Lummer, et al., disclose at column 5, line 54, et seq., "In addition to the components . . . , the agent . . . can also contain appropriate additives, preferably antioxidants and polysaccharides (gums) in effective quantities (gums are additional thickeners). . . . It has been found that polysaccharides have an advantageous effect on the rheological properties of crosslinked polyacrylates, particularly those having viscosity values in the lower range of the viscosity limits indicated above, that is within the range from about 1000 to 5000 mpas. Preferred polysaccharides are those of the type of high molecular xanthan gum."

Koenig-Lummer, et al., disclose suitable corrosion inhibitors to include those belonging to the group comprising inorganic metal salts, alkali metal salts of fatty acids, monoalkyl amines and dialkyl amines—optionally alkoxylated—and salts thereof, alkanol amines optionally alkoxylated—and salts thereof, esters of phosphorous acid or of phosphoric acid, and triazoles.

German Patent application No. 3,143,059, published May 5, 1983, discloses an anti-icing composition using a cellulose derivative thickener to provide a solution having a viscosity of 100 to 5000 mPa. sec at 20° C. The composition contains surfactant which is an alkali alkaryl sulfonate or oxyalkylated fatty alcohol, corrosion inhibitor and alkali carbonate, alkali hydroxide or amine to give a pH of 7.5 to 10. The application states that the composition may contain other thickeners, particularly polyacrylate or xanthan gum.

An anonymous disclosure in Research Disclosure, April, 1985, No. 25246, entitled "Aircraft De-icer", describes aircraft anti-icer concentrate to which water and/or glycol can be added. The anti-icer concentrate comprises water and an antifreeze as the two main components; up to 5 percent by weight of a thickener from the group comprising cellulosic derivatives such as alkyl, hydroxy alkyl and carboxy alkyl, ethers or mixed ethers of cellulose, crosslinked or non-crosslinked polyacrylates, xanthan gum, starch or starch derivatives and guar, it being possible for all except for the polyacrylates also to act as co-thickeners; an active amount of a tenside, optionally in combination with a water insoluble compound, the tenside being selected from the group comprising polyalkylene glycols, polyalkyl oxalates of alcohols, carboxylic acids, amines or amides, olefin sulfonates, fatty alcohol sulfates and alkyl benzene sulfonates, and the water insoluble compound being selected from the group comprising fatty alcohols, fatty acid esters, fatty acid alkanolamides, mineral oils, alkyl phenols and alkyl benzenes; customary corrosion inhibitors, such as, for example, carbonates, phosphates, silicates, amines, ethanolamines and benzotriazoles; and sufficient alkali that the pH value of the agent is within the desired alkaline range.

Xanthan gum has one of the best shear stability characteristics of any known polymer. Xanthan gum, however, is highly susceptible to gelling which would be undesirable in anti-icing fluids. For example, in the field of enhanced oil recovery, gelling of a xanthan gum solution can be induced easily by the use of certain metal ions for use as fracturing fluids. Hence, in order for an xanthan gum to be suitable for use in an anti-icing fluid, a fluid composition in which the xanthan gum has substantial storage stability is essential for its practical use.

SUMMARY OF THE INVENTION

The de-icing and anti-icing compositions of this invention comprise a microemulsion having a continuous phase and a discontinuous phase, said continuous phase comprising:
(a) from 5% to 85% by weight based on the weight of the total composition of a glycol, and
(b) from 5% to 95% by weight of water based on the weight of the total composition;

said discontinuous phase comprising:
a water insoluble oil comprising at least one substantially water insoluble, partially polar compound such as carboxylic acids, sulfonic acids, phosphonic acids, salts and polar esters thereof having hydrocarbyl substituents of at least about 6, often 10 to 40, e.g., 10 to 18, carbon atoms per polar group, said substantially water insoluble partially polar compound preferably being at least one of carboxylic acid having from 10 to 18 carbon atoms and hydrocarbyl-substituted polyacrylate, said hydrocarbyl substituents having about 6 to 40 carbon atoms, in an amount of from 0.1% to 2.5% by weight based on the weight of the total composition, and if at least one other water insoluble oil is present, up to 5.0% by weight based on the total weight of the composition may be water insoluble oil; and the remainder of the composition comprising:
(c) from 0.05% to 10.0% by weight based on the weight of the total composition of a thickening agent selected from the group consisting of natural and artificial gums, cellulose ethers, carboxymethylcellulose and hydroxyethylcellulose, and
(d) an emulsifier selected from the group consisting of anionic surfactants and non-ionic surfactants and mixtures thereof, said emulsifier being present in an amount of from 0.1 times to 100 times the concentration of the water insoluble oil, and
(e) from 0.1% to 2.5% by weight of alkanolamines based on the weight of the total composition, said total composition having a pH of from 6 to 10.

DETAILED DESCRIPTION OF THE INVENTION

The compositions of this invention are in the form of a microemulsion. The term "microemulsion" connotes that composition appears clear but the occluded phase (i.e., the non-continuous phase) is still able to effect the refraction of light. Generally, the occluded phase has droplet sizes less than 0.5 microns in diameter and in many instances the occluded phase comprises micelles. Microemulsions are characterized by having the oil dispensed in micro droplets in the aqueous solution so that these droplets are smaller than the wavelength of visible light and consequently the microemulsion appears transparent. Procedures for preparing microemulsions are fully described in the textbook "Microemulsion Theory and Practice", Leon M. Prince, Editor (Academic Press, Inc. 1977).

Advantageous compositions of this invention provide excellent de-icing and anti-icing properties, shear stability, and rheological properties such that the compositions are readily removed from the aircraft surfaces during takeoff, even at temperatures below 0° C., e.g., to −20° C. Moreover, the properties of the compositions are not unduly affected by evaporation of water after application to a surface. The compositions also exhibit good storage stability, particularly with the composition using xanthan gum thickening agents.

The compositions of the present invention are characterized by a continuous phase comprising water and glycols meaning that the water/glycols phase extends through all parts of the microemulsion in a continuous fashion. This combination can vary from a water concentration of from 25% to 95% by weight based on the total weight of the composition. The preferred water concentration range for the de-icer and anti-icer composition would be from 40% to 50% by weight of the total composition.

The glycols useful in the compositions of this invention include those heretofore suggested for de-icing, representative of which are ethylene glycol, diethylene glycol, triethylene glycol, propylene glycol (1,2-propanediol and 1,3-propanediol), dipropylene glycol, glycerol and mixtures thereof. See, for instance, U.S. Pat. Nos. 2,373,727; 3,940,389 and 4,358,389.

The oil which forms the discontinuous phase of the composition includes, but is not limited to, non-polar and partially polar, aliphatic and aromatic oils such as mineral oil, paraffin oil, silicone oil, propylene oxide/ethylene oxide copolymers as well as sulfated, sulfonated, phosphated and phosphonated oils and the like. Thus, the oils include the partially polar carboxylic acids such as those having from 10 to 18 carbon atoms and hydrocarbyl-substituted polyacrylates. The hydrocarbyl-substituted polyacrylates comprise repeating units having hydrocarbyl substituents, which may be alkyl, aralkyl, aryl or alkaryl, of about 6 to 40 carbon atoms. Generally, the molecular weight of the hydrocarbyl-substituted polyacrylates is less than about 100,000, say about 700 to 50,000.

The partially polar compounds comprise at least a portion of the oil and are provided in an amount of about 0.1 to 2.5 percent by weight based on the total composition. The partially polar compounds will usually comprise a microemulsion of micelles. The addition of further water insoluble oils generally leads to an increase in the micelle size. The total oil is in an amount up to about 5% by weight based on the total composition and when oils other than the partially polar compounds are used, they are preferably present in amounts of at least about 0.01% by weight of the total composition. The amount of such oil present in the microemulsion with the continuous phase components of the composition of this invention should be in the range of from 0.01% to 5.0% by weight based on the total weight of the composition. The preferred range is between 0.1% to 1.0% by weight based on the total weight of the composition.

The water soluble thickening agent useful in the present invention to improve the anti-icing characteristics of the composition includes starches, modified starches and starch derivatives, as well as natural and artificial gums, cellulose ether, carboxymethylcellulose, hydroxyethylcellulose, methylcellulose and their derivatives, ethylene oxide/propylene oxide copolymers, polyvinyl alcohol and their related products. Xanthan gums are the preferred thickening agents. The amount of such thickening agent can vary from 0.05% to 10.0% by weight based on the total weight of the composition. The preferred range is from 0.05% to 5% by weight based on the total weight of the composition.

The emulsifiers used in the present composition can include any of a wide range of anionic surfactants such as organo-phosphates, phosphonates, sulfates and sulfonates, as well as fatty acid salts and non-ionic surfactants such as alcohols, phenols, amines, fatty acids and their alkoxylated derivatives, and the like. The above anionic and non-ionic surfactants can be used singly or preferably in a combination of at least two surfactants to facilitate microemulsification. The amount of emulsifier to produce the desired microemulsion is between 0.1 times to about 100 times the concentration by weight of the oil present in the composition. The preferred range is from about 2 times to 20 times the concentration by weight of the oil.

The composition of the present invention is blended into a microemulsion in order that the de-icing and anti-icing composition will maintain storage stability, clarity and flow characteristics even when stored under the freezing temperatures that prevail in northern climates during the winter months.

The de-icing and anti-icing composition of this invention should have a pH of between 6 and 10 with a preferred range between 7 and 9. Buffers can be included in the composition to provide this pH range. Suitable buffers include, but are not limited to, borates, phosphates, carbonates, benzoates or mixtures thereof. Such buffer, if used, would preferably be employed in an amount of between 0.1% and 2.0% by weight of the total composition.

One minor additive that is particularly desirable is a defoamer in view of the substantial quantities of emulsifier employed in the composition. Any commercially available defoamer or anti-foamer can be used, but a particularly preferred defoamer is a silicone defoamer of Union Carbide Corporation sold under the trade mark SAG. The amount of this defoamer to be used is preferably in the range of from 0.05% to 0.5% by weight based on the weight of the total composition.

The anti-icing property of the invention can be measured by the use of the following procedure. A mixture of ethylene glycol and water at a ratio of 88:12 will be used as a reference material because of its known anti-icing property. Under the set condition of −8° C. and at a precipitation rate of 1.08 mm/hr, the reference material was measured to have 15 minutes of anti-icing time.

As an illustration, both the reference material and a composition of the above invention were applied to the surfaces of two separate aluminum panels cooled to −20° C. A mist of freezing water was then sprayed onto the surfaces until frost forms in both cases. The times elapsed were recorded. Based on the 15 minute anti-icing protection time of the reference material, the protection time of the invention composition could be calculated.

While, the anti-icing time of any composition varied as a function of the temperature and precipitation rates, it was estimated that a de-icing, anti-icing fluid of a yield value of 1 dyne/cm$^2$ would give approximately 2 hours of anti-icing protection under the temperature and precipitation conditions as mentioned above. The yield value is defined as the minimum amount of force required to initiate the flow of a fluid from its rest state. In general practice, it can be approximated by the use of Brookfield LVT viscosities.

The following example of de-icing and anti-icing compositions of the present invention are set forth for purposes of illustrations, but are in no way intended to limit the scope of the invention.

EXAMPLE 1

A microemulsion composition of the invention can be prepared by mixing ethylene glycol, water and mineral oil vigorously at up to 70° C. together with the other components to form the de-icer and anti-icing composition. The microemulsion was allowed to cool slowly to room temperature (25° C.). The resulting product had a clear bright appearance and contained the following components in percentages by weight based on the total weight of the composition:
- (a) 84.0% ethylene glycol
- (b) 2.0% dipotassium hydrogen phosphate
- (c) 0.1% xanthan gum
- (d) 6.9% water
- (e) 1.0% white mineral oil 10 cst (f) 1.5% carboxylic acid having from 10–18 carbon atoms
- (g) 1 5% triethanolamine
- (h) 3.0% of a mixture of non-ionic surfactants of HLB 5–14

EXAMPLE 2

A microemulsion was prepared to demonstrate the synergistics of the following components, the percentages given are percents by weight based on the total weight of the composition:
- (a) 40.0% ethylene glycol
- (b) 14.0% diethylene glycol
- (c) 41.7% water
- (d) 2.0% dipotassium hydrogen phosphate
- (e) 0.1% xanthan gum
- (f) 0.25% mineral oil
- (g) 1.0% carboxylic acid having from 10–18 carbon atoms
- (h) 0.7% triethanolamine
- (i) 0.25% of a mixture of non-ionic surfactants of HLB 5–14

The yield value of the de-icing and anti-icing agent at $-5°$ C. in the absence of components (f) through (j) was found to be 0.14 dyne/cm$^2$ while a composition containing all of the above components gives a yield value of 1.0 dyne/cm$^2$ under the same temperature conditions. This corresponds to a significant improvement in rheological properties due to the synergistic activity between the xanthan gum and the microemulsion.

EXAMPLE 3

A de-icing and anti-icing composition containing silicone oil was proposed by mixing the following components in a microemulsion. Again, the amounts are in percent by weight based on the total weight of the composition:
- (a) 40.0% ethylene glycol
- (b) 14.0% diethylene glycol
- (c) 41.4% water
- (d) 0.1% xanthan gum
- (e) 0.2% tolyltriazole
- (f) 1.0% carboxylic acid having from 10 to 18 carbon atoms
- (g) 1.0% triethanolamine
- (h) 1 0% of a mixture of non-ionic surfactants of HLB 5–14
- (i) 0.3% potassium hydroxide
- (j) 1.0% dimethyl polysiloxane (10–20 cst)

This composition had substantially the same yield value as in Example 2.

EXAMPLE 4

A de-icing and anti-icing composition similar to the sample prepared in Example 3 can be obtained by replacing the dimethyl polysiloxane with 0.25% by weight of propylene oxide based synthetic oil of 300 SUS viscosity to give the same magnitude of synergistic thickening activity as in Example 2.

EXAMPLE 5

Another composition containing anionic surfactants was prepared by mixing the following components in a microemulsion:
- (a) 36.0% ethylene glycol
- (b) 18.0% diethylene glycol
- (c) 42.27% water
- (d) 0.3% potassium hydroxide
- (e) 0.2% tolyltriazole
- (f) 0.13% xanthan gum
- (g) 1.0% carboxylic acid having from 10 to 18 carbon atoms
- (h) 1.0% triethanolamine
- (i) 0.5% sodium arylalkylsulfonate
- (j) 0.5% phosphorester 600 anionic surfactant
- (k) 0.1% mineral oil The yield value calculated based on the Brookfield viscosities at $-5°$ C. is 1.26 dyne/cm$^2$.

EXAMPLE 6

A de-icer and anti-icing composition having a relatively high yield value of 17.0 dyne/cm$^2$ can be prepared by use of the following components in percent by weight based on the total weight of the composition to demonstrate the increase in shear stability of the microemulsified fluid:
- (a) 36.0% ethylene glycol
- (b) 18.0% diethylene glycol
- (c) 41.95% water
- (d) 0.3% potassium hydroxide
- (e) 0.2% tolyltriazole
- (f) 0.3% xanthan gum
- (g) 1.0% carboxylic acid having 10–18 carbon atoms
- (h) 1.0% triethanolamine
- (i) 1.0% of a mixture of non-ionic surfactants of HLB 5–14
- (j) 0.25% mineral oil When sheared by the use of a Brookfield counter-rotating mixer for 5 minutes at 3500 rpm, the yield value reduced to 14.4 dyne/cm$^2$ while the composition without microemulsion gives a yield value of only 12 dyne/cm$^2$.

EXAMPLE 7

A similar composition can also be prepared by microemulsifying the following components in percent by weight based on the total weight of the composition to demonstrate the synergistic thickening activity using a water soluble polymer other than xanthan gum:
- (a) 40.0% ethylene glycol
- (b) 14.0% diethylene glycol
- (c) 41.65% water
- (d) 0.3% potassium hydroxide
- (e) 0.2% benzotriazole
- (f) 0.5% carboxy methyl cellulose
- (g) 1.0% carboxylic acid having 10–18 carbon atoms
- (h) 1.0% triethanolamine
- (i) 1.0% of a mixture of non-ionic surfactants of HLB 5–14

(j) 0.35% mineral oil

The yield value of the composition in the absence of components (g) through (j) at −18° C. is zero. While incorporating components (g) to (j) gives a value of 0.40 dyne/cm². The use of the microemulsion with the mineral oil, carboxylic acid and other components has in fact rendered a desired rheological property to the polymer in the water/glycol solution.

The following table sets forth additional compositions of this invention that have desirable de-icing and anti-icing properties and advantageous rheological properties with shear stability and storage stability.

TABLE I (all percentages are by weight based on the total composition)

| Compound | Composition A % | Composition B % | Composition C % |
|---|---|---|---|
| Monoethylene glycol | 36 | 37 | — |
| Diethylene glycol | 18 | 18 | — |
| Triethylene glycol | — | — | 55 |
| Water | 42.3 | 41.9 | 41.87 |
| Xanthan Gum | 0.13 | 0.1 | 0.1 |
| Ammonium polyacrylate | 0.5 | — | — |
| Isosteric Acid | 1.0 | 1.0 | 1.0 |
| Triethanol Amine | 1.0 | 1.0 | 1.0 |
| Non-ionic surfactants, HLB 5-14 | 1.0 | 1.0 | 1.0 |
| Potassium hydroxide (50%) | 0.06 | 0.04 | 0.04 |

We claim:

1. A de-icer and anti-icing composition comprising a microemulsion having a continuous phase and a discontinuous phase, said continuous phase comprising:
   (a) from 5% to 85% by weight based on the weight of the total composition of a glycol selected from the group consisting of ethylene glycol, diethylene glycol, triethylene glycol, propylene glycol, dipropylene glycol, glycerol and mixtures thereof, and
   (b) from 5% to 95% by weight of water based on the weight of the total composition;
   said discontinuous phase comprising: up to 5.0% by weight based on the total weight of the composition of a water insoluble oil, the oil comprises at least one substantially water-insoluble, partially polar compound in an amount of from 0.1% to 2.5% by weight based on the weight of the total composition, and the remainder of the composition comprising:
   (c) from 0.05% to 10.0% by weight based on the weight of the total composition of a thickening agent selected from the group consisting of natural and artificial gums, cellulose ethers, carboxymethylcellulose and hydroxyethylcellulose,
   (d) an emulsifier selected from the group consisting of anionic surfactants and non-ionic surfactants and mixtures thereof, said emulsifier being present in an amount of from 0.1 times to 100 times the concentration of the water insoluble oil, and
   (e) from 0.1% to 2.5% by weight of alkanolamines based on the weight of the total composition;
   said total composition having a pH of from 6 to 10.

2. A composition as claimed in claim 1 wherein the partially polar compound comprises at least one of carboxylic, sulfonic and phosphonic acids, salts or polar esters having hydrocarbyl substituents of at least about 6 carbon atoms per group.

3. A composition as claimed in claim 1 wherein the partially polar compound comprises carboxylic acid salt of 10 to 18 carbon atoms.

4. A composition as claimed in claim 3 wherein:
   (a) the glycol is present in an amount of from 40% to 60% by weight based on the weight of the total composition,
   (b) said water is present in an amount of from 40% to 50% by weight, said water insoluble oil comprises carboxylic acid and is present in an amount of from 0.1% to 1.0% by weight,
   (c) said thickening agent is present in an amount of from 0.1% to 5.0% by weight, and
   (d) said emulsifier is present in an amount of between 2.0 times to 20.0 times the concentration by weight of said water insoluble oil.

5. A composition as claimed in claim 4 wherein said water insoluble oil comprises mineral 6. A composition as claimed in claim 1 wherein thickening agent comprises xanthan gum.

7. A composition as claimed in claim 1 wherein the emulsifier comprises non-ionic surfactant.

8. A composition as claimed in claim 7 wherein the non-ionic surfactant provides an HLB of to 14.

9. A composition as claimed in claim 1 having a pH of from 7 to 9.

10. A composition as claimed. claim 1 further comprising a defoamer.

11. A de-icer and anti-icing composition comprising a microemulsion having a continuous phase and a discontinuous phase, said continuous phase comprising:
   (a) from 5% to 85% by weight based on the weight of the total composition of a glycol selected from the group consisting of ethylene glycol, diethylene glycol, propylene glycol, dipropylene glycol and mixtures thereof, and
   (b) from 5% to 95% by weight of water based on the weight of the total composition; said discontinuous phase comprising: from 0.01% to 5.0% by weight based on the total weight of the composition of a water insoluble oil, and the remainder of the composition comprising:
   (c) from 0.05% to 10.0% by weight based on the weight of the total composition of a thickening agent selected from the group consisting of natural and artificial gums, cellulose ethers, carboxymethylcellulose and hydroxyethylcellulose,
   (d) an emulsifier selected from the group consisting of anionic surfactants and non-ionic mixtures thereof, said emulsifier being present in an amount of from 0.1 times to 100 times the concentration of the water insoluble oil,
   (e) a carboxylic acid having from 10 to 18 carbon atoms in an amount of from 0.1% to 2.5% by weight based on the weight of the total composition, and
   (f) from 0.1% to 2.5% by weight of alkanolamines based on the weight of the total composition; said total composition having a pH of from 6 to 10.

12. A composition as claimed in claim 11 wherein;
   (a) the glycol is present in an amount of from 40% to 60% by weight based on the weight of the total composition,
   (b) said water is present in an amount of from 40% to 50% by weight, said water insoluble oil is present in an amount of from 0.1% to 3.0% by weight,
   (c) said thickening agent is present in an amount of from 0.1% to 5.0% by weight, and (d) said emulsifier is present in an amount of between 2.0 times to 20.0 times the concentration by weight of said water insoluble oil.

13. A composition as claimed in claim 12 wherein said glycol is ethylene glycol and wherein said water insoluble oil is mineral oil.

14. A composition as claimed in claim 11 wherein thickening agent is xanthan gum and wherein said emulsifier is a non-ionic surfactant.

* * * * *